(12) United States Patent
Patel et al.

(10) Patent No.: US 10,501,068 B2
(45) Date of Patent: Dec. 10, 2019

(54) METHOD AND APPARATUS FOR CONTROLLING A MULTI-MODE POWERTRAIN SYSTEM

(71) Applicant: GM GLOBAL TECHNOLOGY OPERATIONS LLC, Detroit, MI (US)

(72) Inventors: Krunal P. Patel, Sterling Heights, MI (US); Samantha Victoria Lado, Highland, MI (US); Jy-Jen F. Sah, Warren, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 256 days.

(21) Appl. No.: 15/132,591

(22) Filed: Apr. 19, 2016

(65) Prior Publication Data
US 2017/0297553 A1 Oct. 19, 2017

(51) Int. Cl.
*B60W 20/10* (2016.01)
*B60K 6/547* (2007.10)

(52) U.S. Cl.
CPC ............. *B60W 20/10* (2013.01); *B60K 6/547* (2013.01)

(58) Field of Classification Search
CPC .................................................... B60W 20/10
See application file for complete search history.

(56) References Cited

U.S. PATENT DOCUMENTS

2015/0112561 A1* 4/2015 Satoyoshi .......... F16H 61/0213
701/65
2017/0137021 A1* 5/2017 Nefcy ................. F16H 61/0204
(Continued)

FOREIGN PATENT DOCUMENTS

CN 103010214 A 4/2013
CN 103569099 A 2/2014
(Continued)

OTHER PUBLICATIONS

J-O Hahn J-W Hur G-W Choi Ym Cho K I Lee, 'Self-learning approach to automatic transmission shift control in a commercial construction vehicle during the inertia phase', 2002, Proc Instn Mech Engrs vol. 216 Part D: J Automobile Engineering (Year: 2002).*

Primary Examiner — Jonathan M Dager
Assistant Examiner — Garrett F Evans
(74) Attorney, Agent, or Firm — Quinn IP Law (57) ABSTRACT

A method for controlling a powertrain system in response to a command to execute a multi-state shift event for the transmission includes determining an initial output torque limit and determining an initial commanded output torque based upon the initial output torque limit. The powertrain system is controlled to generate torque in response to the initial commanded output torque prior to completion of a first state transition of the multi-state shift event that includes a commanded torque reduction. After completion of the first state transition of the multi-state shift event that includes the commanded torque reduction, a torque ramp rate is determined, and the initial commanded output torque is adjusted based upon the torque ramp rate. The powertrain system is controlled to generate torque in response to the initial commanded output torque and the adjusted initial commanded output torque during a remainder of the multi-state shift event.

14 Claims, 3 Drawing Sheets

(56) References Cited

U.S. PATENT DOCUMENTS

2017/0320484 A1\* 11/2017 Nefcy .................. F16H 61/0204
2017/0327122 A1\* 11/2017 Ishida ...................... B60K 6/48

FOREIGN PATENT DOCUMENTS

| CN | 103832429 A | 6/2014 |
| CN | 104369738 A | 2/2015 |
| JP | 2013226912 A | 11/2013 |

\* cited by examiner

METHOD AND APPARATUS FOR CONTROLLING A MULTI-MODE POWERTRAIN SYSTEM

TECHNICAL FIELD

This disclosure is related to multi-mode powertrain systems employing multiple torque-generative devices, and dynamic system controls associated therewith.

BACKGROUND

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, drivability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A multi-mode powertrain system is described, including a transmission that is operative in a plurality of fixed gear states and variable states. A method for controlling the powertrain system in response to a command to execute a multi-state shift event for the transmission includes determining an initial output torque limit and determining an initial commanded output torque based upon the initial output torque limit. The powertrain system is controlled to generate torque in response to the initial commanded output torque prior to completion of a first state transition of the multi-state shift event that includes a commanded torque reduction. After completion of the first state transition of the multi-state shift event that includes the commanded torque reduction, a torque ramp rate is determined, and the initial commanded output torque is adjusted based upon the torque ramp rate. The powertrain system is controlled to generate torque in response to the initial commanded output torque and the adjusted initial commanded output torque during a remainder of the multi-state shift event.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
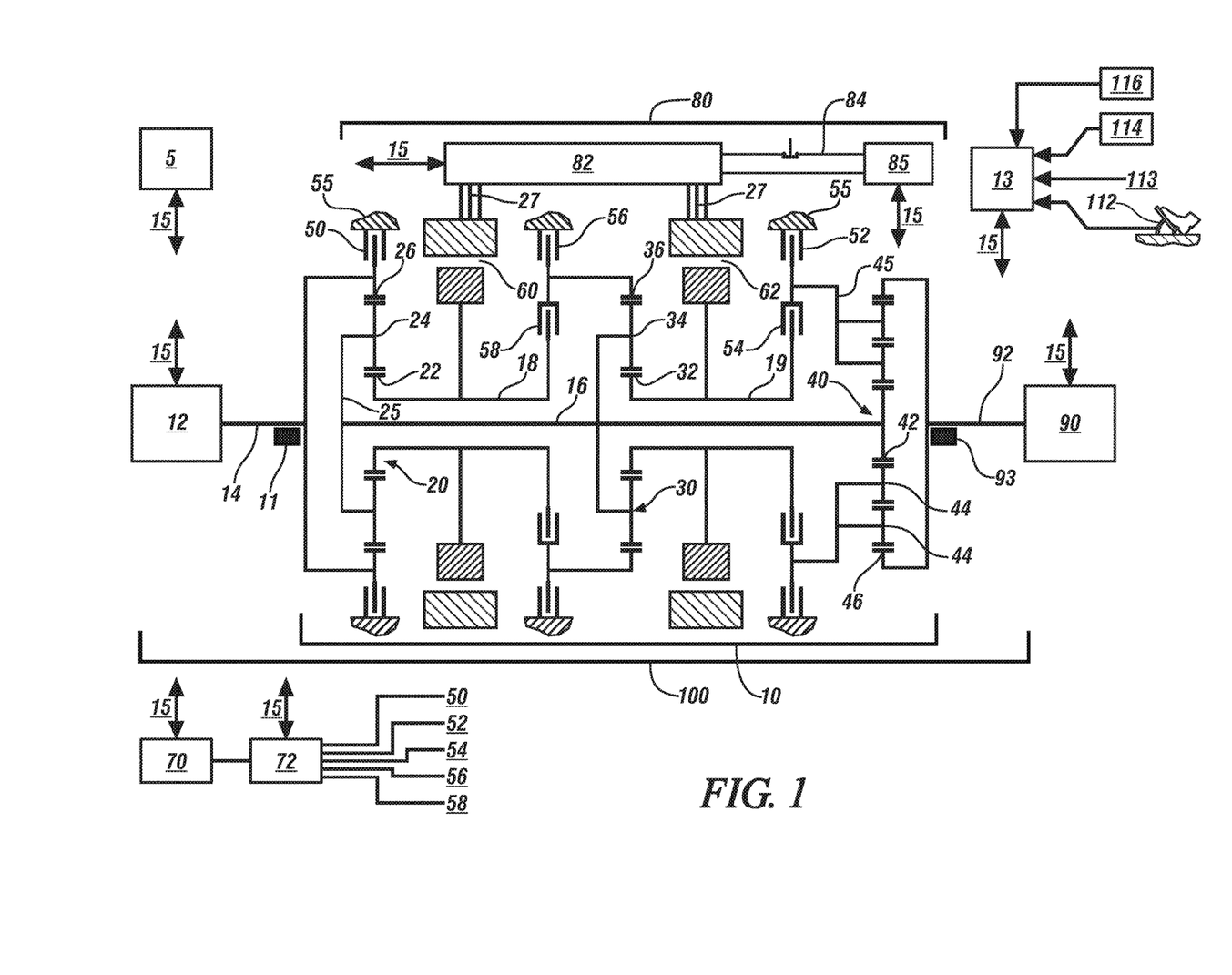
FIG. 1 schematically shows an embodiment of a multi-mode powertrain system including an internal combustion engine, transmission, and a driveline in accordance with the disclosure.

Referring now to the drawings, which are provided for the purpose of illustrating certain exemplary embodiments only and not for the purpose of limiting the same, FIG. 1 depicts a non-limiting multi-mode powertrain 100 that includes an internal combustion engine (engine) 12 and non-combustion torque machines in the form of first and second torque machines 60, 62, respectively, that are arranged to transfer torque via a multi-mode transmission (transmission) 10 to a driveline 90. A high-voltage electrical system 80 is arranged to supply electric power to the first and second torque machines 60, 62, and includes an electrical energy storage device, e.g., a high-voltage DC power source (battery) 85. The multi-mode powertrain 100 may be advantageously employed on a vehicle to provide propulsion power to the driveline 90, which couples to one or more vehicle wheels in one embodiment. The vehicle may include, by way of non-limiting examples, a passenger vehicle, a light-duty or heavy-duty truck, a utility vehicle, an agricultural vehicle, an industrial/warehouse vehicle, or a recreational off-road vehicle. A non-combustion torque machine may be any machine that utilizes a non-combustion process to generate mechanical power in the form of torque employing stored or generated power that may originate from electric energy, pneumatic energy, hydraulic energy or another energy source.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., engine speed and engine torque, can differ from input speed and input torque to the transmission 10 due to placement of torque-consuming components on the input member 14 between the engine 12 and the transmission 10, e.g., a torque management device or a mechanically-powered hydraulic pump. The engine 12 is configured to execute autostop and autostart operations during ongoing powertrain operation in response to operating conditions. A controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of the first and second torque machines 60, 62.

The transmission 10 mechanically couples to the engine 12 and first and second torque machines 60, 62, respectively, and is configured to transfer torque between the engine 12, the first and second torque machines 60, 62, and the driveline 90. In one embodiment, and as illustrated, the first and second torque machines 60, 62 are electric motor/generators that employ electric energy to generate and react torque. As described herein, the multi-mode powertrain 100 is configured to operate in one of a plurality of powertrain states, and is a non-limiting embodiment of a powertrain system on which the concepts described with reference to FIGS. 2, 3 and 4 may advantageously operate.

The transmission 10 may be any suitable torque transmission device. In one embodiment, the transmission is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission 10 are contemplated. Members of the transmission 10 couple to the first and second torque machines 60, 62 to effect torque transfer. The transmission 10 is configured to transfer torque between the engine 12, the torque machines 60, 62, and an output member 92 in response to an output torque request. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member. The planet gears 34 are disposed in meshing relationship with both the sun gear member 32 and the ring gear member 36. The carrier member couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, and band clutches. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60, 62. Hydraulic pressure in the hydraulic circuit 72 may be determined by measurement using pressure sensor(s), by estimation using on-board algorithms, or using other suitable methods.

The first and second torque machines 60, 62 are three-phase AC motor/generator machines in one embodiment, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear set 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60, 62. Additionally, the signals output from the resolvers may be used to determine rotational speeds for first and second torque machines 60, 62.

The output member 92 of the transmission 10 is rotatably connected to the driveline 90 to provide output power to the driveline 90 that is transferred to one or a plurality of vehicle wheels via differential gearing or another suitable device in this embodiment. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The battery 85 of the high-voltage electrical system 80 is electrically coupled to a transmission power inverter control module (TPIM) 82 via a high-voltage electrical bus 84, and is configured with suitable devices for monitoring electric power flow including devices and systems for monitoring electric current and voltage. The battery 85 can be any suitable high-voltage electrical energy storage device, e.g., a high-voltage battery, and preferably includes a monitoring system that provides a measure of electrical power supplied to the high-voltage electrical bus 84, including voltage and electric current. In one embodiment, the battery 85 may electrically connect to an external charging station for charging from a remote electrical power source when the vehicle is stationary.

The input torque from the engine 12 and the motor torques from the first and second torque machines 60, 62 are generated as a result of energy conversion from fuel or electrical potential stored in the electrical energy storage device (battery) 85. The battery 85 is high voltage DC-coupled to the TPIM 82 via the high-voltage electrical bus 84 that preferably includes a contactor switch that permits or prohibits flow of electric current between the battery 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters may include complementary three-phase power electronics devices, in the form of a plurality of switching transistors, e.g., insulated gate bipolar transistors (IGBTs). The power inverters of the TPIM 82 convert DC power that is supplied from the battery 85 to AC power for powering respective ones of the first and second torque machines 60, 62. The IGBTs form a switch mode power supply configured to receive control commands. There is a pair of IGBTs for each phase of each of the first and second torque machines 60, 62. States of the IGBTs are controlled to provide motor drive mechanical power generation or electric power regeneration functionality. The power inverters receive or supply DC electric power via DC transfer conductors 27 and transform it to or from three-phase AC power, which is conducted to or from the first and second torque machines 60, 62 for operation as motors or generators via transfer conductors. The TPIM 82 transfers electrical power to and from the first and second torque machines 60, 62 through the power inverters and respective motor control modules in response to the motor torque commands. Electrical current is transmitted across the high-voltage electrical bus 84 to and from the battery 85 to charge and discharge the battery 85.

The controller 5 signally and operatively links to various actuators and sensors in the multi-mode powertrain 100 via a communications link 15 to monitor and control operation of the multi-mode powertrain 100, including synthesizing information and inputs, and executing algorithms to control actuators to meet control objectives related to fuel economy, emissions, performance, drivability and protection of hardware. The controller 5 is depicted as a unitary device for ease of illustration; one of ordinary skill in the art understands that the controller 5 may include a plurality of individual control modules that are distributed throughout the multi-mode powertrain 100 to provide a coordinated system. The controller 5 may include a distributed control module system that includes individual control modules including a supervisory control module, an engine control module, a transmission control module, a battery pack control module, and the TPIM 82.

Furthermore, the controller 5 is preferably a subset of an overall vehicle control architecture. A user interface 13 is preferably signally connected to a plurality of devices through which a vehicle operator directs and commands operation of the powertrain system, and includes commanding an output torque request and selecting a transmission range. The devices preferably include an accelerator pedal 112, an operator brake pedal 113, a transmission range selector 114, and a vehicle speed cruise control system 116. The transmission range selector 114 may have a discrete number of operator-selectable positions to indicate a direction of operator-intended motion of the vehicle, and thus indicate the preferred rotational direction of the output member 92 in either a forward or a reverse direction. It is appreciated that the vehicle may still move in a direction other than the indicated direction of operator-intended motion due to rollback caused by location of a vehicle, e.g., on a hill. The operator-selectable positions of the transmission range selector 114 can correspond directly to individual transmission states described with reference to Table 1, or may correspond to subsets of the transmission states described with reference to Table 1. By way of a non-limiting example, the operator-selectable positions of the transmission range selector 114 may include Park, Reverse, Neutral and Drive, which are commonly referred to as a PRND or PRNDL configuration. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communication speed and provide some level of signal redundancy and integrity, including direct links and serial peripheral interface (SPI) buses. Communication between individual control modules may also be effected using a wireless link, e.g., a short range wireless radio communication bus. Individual devices may also be directly connected.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link, and is indicated by communication link 15. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time The multi-mode powertrain 100 is configured to operate in one of a plurality of powertrain states, including a plurality of transmission states and engine states to generate and transfer torque to the driveline 90. The engine states include an OFF state, and an ON state, which may include a fuel cutoff (FCO) state. When the engine is in the OFF state, it is unfueled, not firing, and is not spinning. When the engine operates in the ON state, it is spinning. The engine ON state may include an all-cylinder state (ALL) wherein all cylinders are fueled and firing, a cylinder-deactivation state (DEAC) wherein a portion of the cylinders are fueled and firing and the remaining cylinders are unfueled and not firing, and the FCO state. When the engine operates in the FCO state, it is spinning but is unfueled and not firing. The transmission states include a plurality of fixed gear (Gear #) ranges and variable ranges that are achieved by selectively activating the clutches C5 50, C1 52, C2 54, C3 56 and C4 58. The fixed gear states include those transmission states in which rotational speed of the output member 92 is directly proportional to rotational speed of the input member 14 due to gearing relationships between the interlocking gears of the planetary gear sets caused by activating specific ones of the aforementioned clutches. The variable states include those transmission states in which rotational speed of the output member 92 varies in relation to the input speed of the engine 12 and the rotational speeds of the first and second torque machines 60, 62. The variable states include electrically-variable mode (EVT Mode #), electric vehicle mode (EV #) and transitional and pseudo-gear modes (EV Transitional State # and Pseudo-gear #) and neutral (Neutral). Table 1 depicts a plurality of transmission states and associated engine states and clutch activation states (indicated by 'x') associated with operating the multi-mode powertrain 100.

TABLE 1

| Transmission State | Engine State | Clutch Activation | | | | |
|---|---|---|---|---|---|---|
| | | C1 | C2 | C3 | C4 | C5 |
| Neutral 1 | ON(ALL/DEAC/FCO)/OFF | | | | | |
| Neutral 2 | ON(ALL/DEAC/FCO)/OFF | | x | | | |
| Neutral 3 | ON(ALL/DEAC/FCO)/OFF | | | x | | |
| Pseudo-gear 1 | ON(ALL/DEAC/FCO) | x | | | | |
| Pseudo-gear 2 | ON(ALL/DEAC/FCO) | | x | | | |
| Neutral | OFF | | | | | x |
| EVT Mode 1 | ON(ALL/DEAC/FCO)/OFF | x | | x | | |
| EVT Mode 2 | ON(ALL/DEAC/FCO)/OFF | x | | | x | |
| EVT Mode 3 | ON(ALL/DEAC/FCO)/OFF | | | x | x | |
| EVT Mode 4 | ON(ALL/DEAC/FCO)/OFF | | | x | x | |
| EV Transitional State 1 | OFF | x | | | | x |
| EV Transitional State 2 | OFF | | x | | | x |
| Gear 1 | ON(ALL/DEAC/FCO) | x | | x | x | |
| Gear 2 | ON(ALL/DEAC/FCO) | x | x | | x | |
| Gear 3 | ON(ALL/DEAC/FCO) | | | x | x | x |
| EV1 | OFF | x | | x | | x |
| EV2 | OFF | | x | | x | x |
| EV3 | OFF | | | x | x | x |
| EV4 | OFF | | x | x | | x |

TABLE 1-continued

| Transmission State | Engine State | Clutch Activation | | | | |
|---|---|---|---|---|---|---|
| | | C1 | C2 | C3 | C4 | C5 |
| EV Transitional State 3 | OFF | x | x | | | x |
| Neutral | ON(ALL/DEAC/FCO)/OFF | | | x | x | |
| Pseudo-gear 3 | ON(ALL/DEAC/FCO) | x | x | | | |
| Neutral | OFF | | | x | | x |
| Neutral | OFF | | | | x | x |

Figure 2:
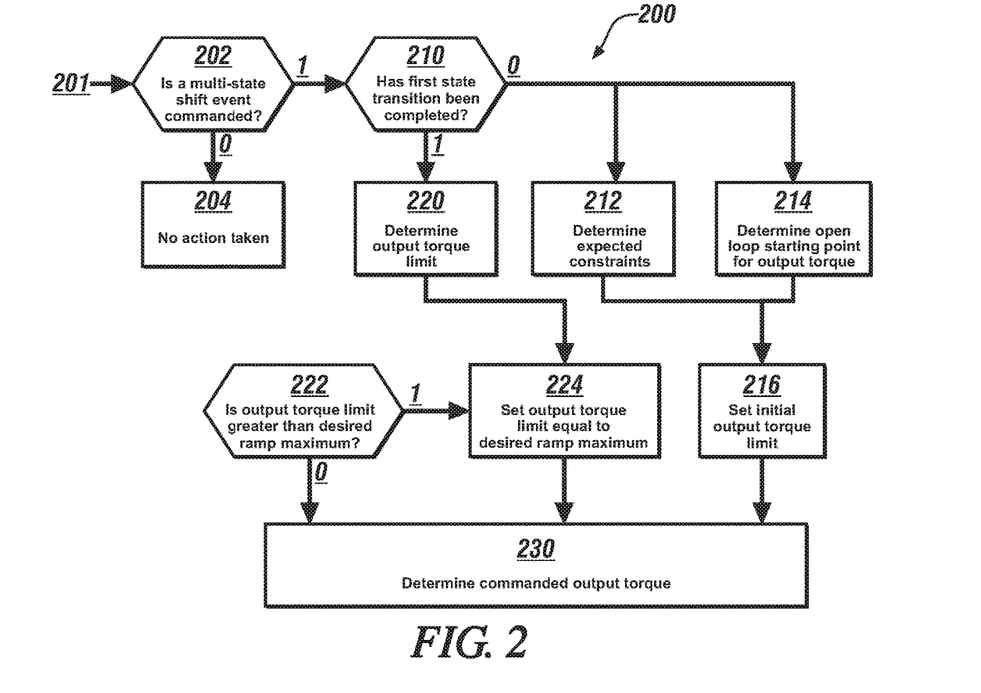
FIG. 2 schematically shows a first multi-state shift routine that may be employed to control a powertrain system during a multi-state shift event, in accordance with the disclosure.

FIG. 2 schematically shows a first multi-state shift routine 200 that may be employed to control a powertrain system during a multi-state shift event. One embodiment of the powertrain system includes an embodiment of the multi-mode powertrain 100 described hereinabove with reference to FIG. 1. Alternatively, the multi-state shift routine 200 may be advantageously employed to control a single-mode powertrain system during a multi-state shift event, wherein the single-mode powertrain system includes an internal combustion engine coupled to a step-gear transmission that is operative in one of a plurality of predetermined gear ratios, wherein the transmission may be commanded to execute a multi-state shift event. A multi-state shift event includes sequentially executed transmission shifts to multiple transmission states, including an initial transmission state, one or a plurality of intermediate transmission states, and a final transmission state. Table 2 is provided as a key wherein the numerically labeled blocks and the corresponding functions are set forth as follows, corresponding to the first multi-state shift routine 200. Those having ordinary skill in the art will recognize that the teachings may be described herein in terms of functional and/or logical block components and/or various processing steps. It should be realized that such block components may be composed of any number of hardware, software, and/or firmware components configured to perform the specified functions.

TABLE 2

| BLOCK | BLOCK CONTENTS |
|---|---|
| 202 | Is a multi-state shift event commanded? |
| 204 | No action taken |
| 210 | Has first state transition of the multi-state shift event been completed? |
| 212 | Determine expected constraints for the first expected output torque reduction |
| 214 | Determine open loop starting point for output torque |
| 216 | Set initial output torque limit to a minimum of the expected constraints for the first expected output torque reduction and the open loop starting point for output torque |
| 220 | Output torque limit equals output torque limit from previous iteration plus output torque increment from ramp rate |
| 222 | Is output torque limit greater than desired ramp maximum? |
| 224 | Set output torque limit equal to desired ramp maximum |
| 230 | Determine commanded output torque by combining output torque limit and actual output torque constraints |

The first multi-state shift routine 200 periodically executes during powertrain operation. The steps of the first multi-state shift routine 200 may be executed in any suitable order, and are not limited to the order described with reference to FIG. 2. Execution of the first multi-state shift routine 200 may proceed as follows.

During powertrain operation, the controller 5 may command a downshift, which is provided as an input signal 201 to the first multi-state shift routine 200. When the transmission state shift includes a command for a single transmission state shift (202)(0), no further action is taken, and this iteration of the first multi-state shift routine 200 ends (204).

When the transmission state shift includes a command for a multi-state shift event to achieve a commanded transmission state (202)(1), the controller executes the multi-state shift event, including determining whether a first transition that includes a decrease in output torque has been completed (210). When shifting through multiple transmission states during the multi-state shift event, an output torque profile is controlled in a manner that considers the entire shift has a whole in order to provide a single smooth torque transition as perceived by the vehicle operator. A command for a multi-state shift event may occur in response to an operator tip-in to the accelerator pedal 112 wherein the vehicle operator has commanded an aggressive vehicle acceleration.

A multi-state shift event may be required to avoid transmission operation in a prohibited state during a shift event, such as may occur when all clutches are deactivated, or when a single shift event may result in activation of mutually-exclusive clutches. By way of example, for purposes of illustration, one exemplary transmission shift may include a shift from EV Mode 4 to EVT Mode 2, wherein clutches C2, C3 and C5 are activated in EV Mode 4, and clutches C1 and C4 are activated and clutches C2, C3 and C5 are deactivated in EVT Mode 2.

Figure 3:
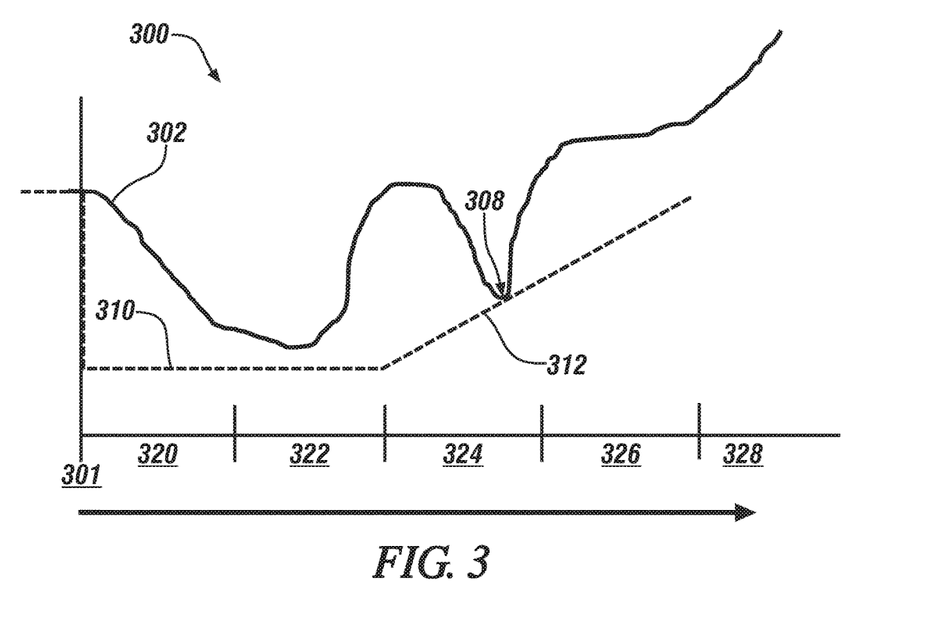
FIG. 3 graphically shows a multi-state shift event in relation to time, including an actual maximum output torque and an output torque profile limit during the shift, in accordance with the disclosure.

One exemplary multi-state shift event is shown graphically with reference to FIG. 3, which includes an actual maximum output torque 300 and an output torque profile limit 310 during the shift, shown in relation to time. Transmission states shown in FIG. 3 are also indicated. Such a shift transition may include as follows in Table 3, for a shift from EV Mode 4 to EVT Mode 2, wherein clutches C2, C3 and C5 are activated in EV Mode 4, and clutches C1 and C4 are activated and clutches C2, C3 and C5 are deactivated in EVT Mode 2. Clutch activation states are indicated by an 'x'.

TABLE 3

| Transmission State | FIG. 3 | Engine State | Clutch Activation | | | | |
|---|---|---|---|---|---|---|---|
| | | | C1 | C2 | C3 | C4 | C5 |
| EV Mode 4 | 320 | OFF | | X | X | | X |
| EV Mode 3 | 322 | Engine starting | | X | | X | X |
| EVT Mode 3 | 324 | ON | | X | | X | |
| Gear 2 | 326 | ON | X | X | | X | |
| EVT Mode 2 | 328 | ON | X | | | X | |

Referring again to FIG. 2, during execution of a multi-state shift event, when the first transition including a decrease in output torque has not yet been completed (210)(0), the first multi-state shift routine 200 determines expected constraints for the first expected output torque reduction (212) and determines an open loop starting point for a maximum value of the output torque (214). The expected constraints for the first expected output torque reduction (212) may include hard constraints such as clutch torque capacities for oncoming and off-going clutches, battery power constraints, mechanical capabilities of the planetary gears and other mechanical devices, etc. The open loop starting point for the output torque (214) may be set as a preferred maximum output torque that may be experienced during operation. An initial output torque limit is set as a minimum of the expected constraints for the first expected output torque reduction and the open loop starting point for output torque (216), and the commanded output torque is determined by combining the initial output torque limit and any actual output torque constraints to control the powertrain system 100 (230). With reference to FIG. 3, initiation of a multi-state shift event is indicated at line 301, and an example of an initial maximum output torque limit is shown with reference to line segment 310, in relation to an actual maximum output torque 302. The maximum achievable output torque 302 may initially decrease as the powertrain transitions the engine from the OFF state to the ON state. However, the initial maximum output torque limit 310 is reduced to the level shown, thus providing a single reduction in the output torque that is discernible to the vehicle operator. The initial reduction in the output torque may be accomplished by controlling one or both of the electric machines 60, 62 in a reactive mode to generate electric power, thus reducing the output torque from the transmission 10.

Referring again to FIG. 2, when the first transition including the decrease in output torque has been completed (210)(1), the first multi-state shift routine 200 begins ramping up the maximum output torque limit by increasing the output torque limit to a sum of the output torque limit from a previous iteration of the first multi-state shift routine 200 and an output torque increment that is determined from a predetermined ramp rate during a remainder of the multi-state shift event (220). The updated output torque limit is compared with a maximum desired ramp torque (222), and if the resultant is less (222)(0), the updated output torque limit is combined with any actual output torque constraints to determine the commanded output torque for controlling the powertrain system 100 (230). When the updated output torque limit is equal to or greater than the maximum desired ramp torque (222)(1), the maximum desired ramp torque is set equal to the updated output torque limit (224), and the maximum desired ramp torque is combined with any actual output torque constraints to determine the commanded output torque for controlling the powertrain system 100 (230).

Referring again to FIG. 3, the first state transition having a decrease in output torque is completed when the transition to the engine ON state is completed, as indicated at the transition from the Mode 3 EV state 322 to the Mode 3 EVT state 324. The maximum output torque limit begins ramping up, as indicated by line segment 312, by increasing the output torque limit to a sum of the output torque limit from a previous iteration of the first multi-state shift routine 200 and an output torque increment that is determined from a predetermined ramp rate. This ramping up of the maximum output torque limit is controlled such that a second decrease in the maximum output torque, indicated at point 308, does not violate the maximum output torque limit as it is ramping up.

Thus, in order to control output torque for a multi-state shift event, the output torque profile combines an open loop predetermined shape with the actual constraints. The predetermined shape may initially cut torque more than is required so that torque can be ramped back to the operator in a controlled manner. Thus, the operator experiences a single torque reduction, as compared to multiple torque reductions that may otherwise be experienced as the transmission transitions through several transmission states.

Figure 4:
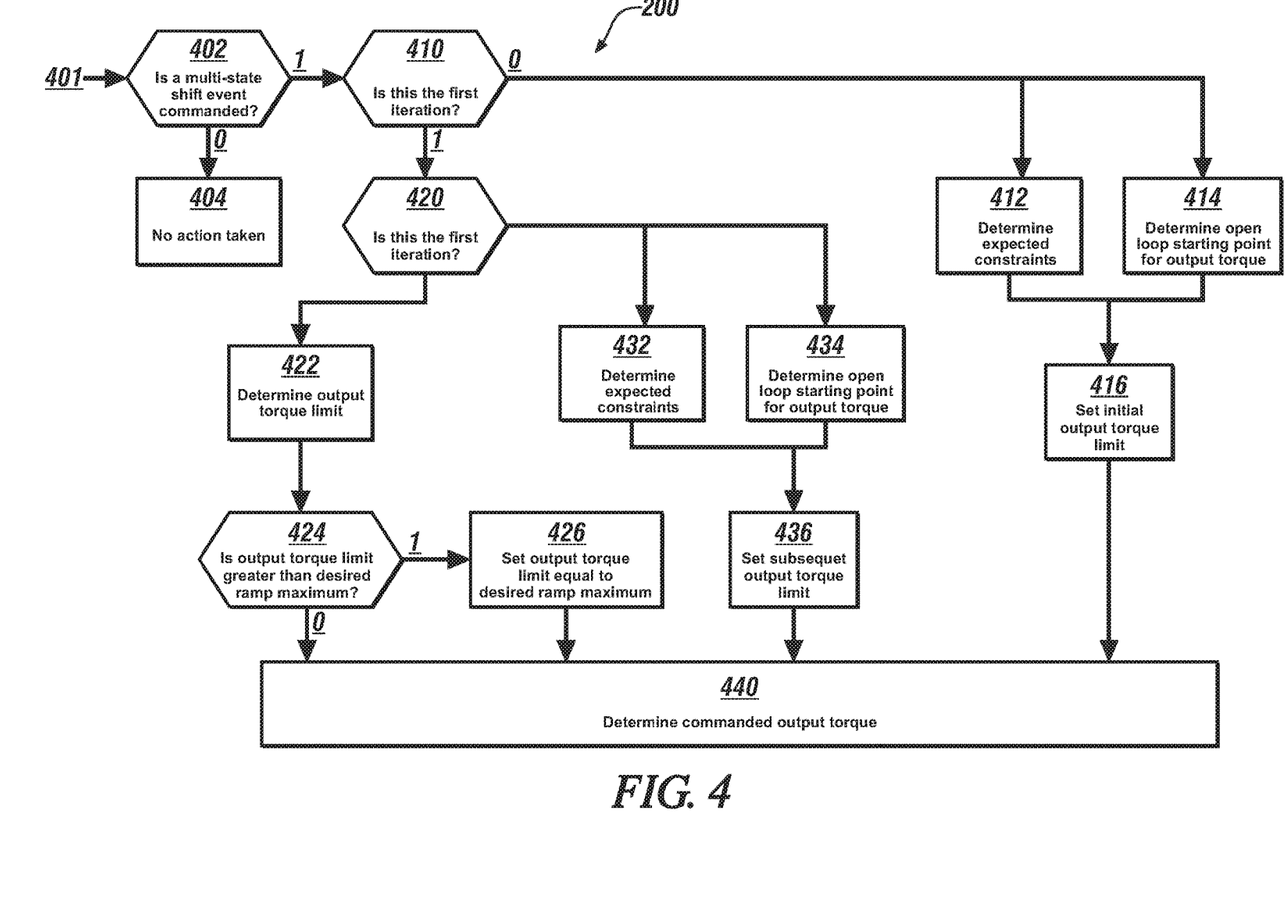
FIG. 4 schematically shows a second multi-state shift routine that may be employed to control a multi-mode powertrain system during a multi-state shift event, in accordance with the disclosure.

FIG. 4 schematically shows a second multi-state shift routine 400 that may be employed to control a multi-mode powertrain system during a multi-state shift event. One embodiment of a multi-mode powertrain system includes an embodiment of the powertrain 100 described hereinabove with reference to FIG. 1. A multi-state shift event includes sequentially executed transmission shifts to multiple transmission states, including an initial transmission state, one or a plurality of intermediate transmission states, and a final transmission state. Table 4 is provided as a key wherein the numerically labeled blocks and the corresponding functions are set forth as follows, corresponding to the second multi-state shift routine 400. Those having ordinary skill in the art will recognize that the teachings may be described herein in terms of functional and/or logical block components and/or various processing steps. It should be realized that such block components may be composed of any number of hardware, software, and/or firmware components configured to perform the specified functions.

TABLE 4

| BLOCK | BLOCK CONTENTS |
|---|---|
| 402 | Is a multi-state shift event commanded? |
| 404 | No action taken |
| 410 | Is this the first iteration of the routine since a shift has been commanded? |
| 412 | Determine expected constraints for the first expected output torque reduction |
| 414 | Determine open loop starting point for output torque |
| 416 | Set initial output torque limit to a minimum of the expected constraints for the first expected output torque reduction and the open loop starting point for output torque |
| 420 | Is this the first iteration that a new shift is indicated and an increase in engine speed has been commanded? |
| 422 | Output torque limit equals output torque limit from previous iteration plus output torque increment from ramp rate |
| 424 | Is output torque limit greater than desired ramp maximum? |
| 426 | Set output torque limit equal to desired ramp maximum |
| 432 | Determine expected constraints for the subsequent expected output torque reduction |
| 434 | Determine open loop starting point for output torque |
| 436 | Set subsequent output torque limit to a minimum of the expected constraints for the first expected output torque reduction and the open loop starting point for output torque |
| 440 | Determine commanded output torque by combining output torque limit and actual output torque constraints |

The second multi-state shift routine 400 periodically executes during powertrain operation. The steps of the second multi-state shift routine 400 may be executed in any suitable order, and are not limited to the order described with reference to FIG. 4. Execution of the second multi-state shift routine 400 may proceed as follows.

During powertrain operation, the controller 5 may command a downshift, which is provided as an input signal 401 to the second multi-state shift routine 400. When the transmission state shift includes a command for a single transmission state shift (402)(0), no further action is taken, and this iteration of the second multi-state shift routine 400 ends (404).

When the transmission state shift includes a command for a multi-state shift event to achieve a commanded transmission state (402)(1), the controller executes the multi-state shift event, including determining whether this is the first iteration of the routine 400 since the multi-state shift event was commanded (410).

When shifting through multiple transmission states during the multi-state shift event, an output torque profile is controlled in a manner that considers the entire shift has a whole in order to provide two smooth torque transitions as perceived by the vehicle operator. A command for a multi-state shift event may occur in response to an operator tip-in to the accelerator pedal 112 wherein an operator has commanded an aggressive vehicle acceleration.

When this is the first iteration of the routine 400 after a multi-state shift event is commanded (410)(1), the second multi-state shift routine 400 determines expected constraints for the first expected output torque reduction (412) and determines a first open loop starting point for a maximum value of the output torque (414). The expected constraints for the first expected output torque reduction (412) may include hard constraints such as clutch torque capacities for oncoming and off-going clutches, battery power constraints, mechanical capabilities of the planetary gears and other mechanical devices, etc. The first open loop starting point for the output torque (414) may be set as a preferred maximum output torque that may be experienced during operation. An initial output torque limit is set as a minimum of the expected constraints for the first expected output torque reduction and the first open loop starting point for output torque (416), and the commanded output torque is determined by combining the initial output torque limit and any actual output torque constraints to control the powertrain system 100 (440).

When this is a subsequent iteration of the routine 400 after a multi-state shift event is commanded (410)(0), the second multi-state shift routine 400 determines whether this is the first iteration in which a new shift is indicated and an increase in engine speed has been commanded (420).

If so (420)(1), the second multi-state shift routine 400 determines expected constraints for a second expected output torque reduction (432) and determines a second open loop starting point for a maximum value of the output torque (434). The expected constraints for the second expected output torque reduction (432) may include hard constraints such as clutch torque capacities for oncoming and off-going clutches, battery power constraints, mechanical capabilities of the planetary gears and other mechanical devices, etc. The second open loop starting point for the output torque (434) may be set as a preferred maximum output torque that may be experienced during operation. An initial output torque limit is set as a minimum of the expected constraints for the second expected output torque reduction and the second open loop starting point for output torque (436), and the commanded output torque is determined by combining the initial output torque limit and any actual output torque constraints to control the powertrain system 100 (440).

If not (420)(0), the second multi-state shift routine 400 begins ramping up the maximum output torque limit by increasing the output torque limit to a sum of the output torque limit from a previous iteration of the second multi-state shift routine 400 and an output torque increment that is determined from a predetermined ramp rate during a remainder of the multi-state shift event (422). The updated output torque limit is compared with a maximum desired ramp torque (424), and if the resultant is less (424)(0), the updated output torque limit is combined with any actual output torque constraints to determine the commanded output torque for controlling the powertrain system 100 (440). When the updated output torque limit is equal to or greater than the maximum desired ramp torque (424)(1), the output torque limit is set equal to the maximum desired ramp torque (426) and is combined with any actual output torque constraints to determine the commanded output torque for controlling the powertrain system 100 (440).

Referring again to FIG. 3, the first state transition having a decrease in output torque is completed when the transition to the engine ON state is completed, as indicated at the transition from the Mode 3 EV state 322 to the Mode 3 EVT state 324. The maximum output torque limit begins ramping up, as indicated by line segment 312, by increasing the output torque limit to a sum of the output torque limit from a previous iteration of the second multi-state shift routine 400 and an output torque increment that is determined from a predetermined ramp rate. This ramping up of the maximum output torque limit is controlled such that a second decrease in the maximum output torque, indicated at point 308, does not violate the maximum output torque limit as it is ramping up.

Thus, in order to control output torque for a multi-state shift event, the output torque profile combines an open loop predetermined shape with the actual constraints. The predetermined shape may initially cut torque more than is required so that torque can be ramped back to the operator in a controlled manner. Thus, the operator experiences two torque reductions, as compared to a plurality of torque reductions that may otherwise be experienced as the transmission transitions through several transmission states. Such operation improves drivability experience that includes multiple transmission state transitions because the operator experiences controlled reductions in output torque during the shift. The operation may also reduce shifting time.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a multi-mode powertrain system including an internal combustion engine and non-combustion torque machines configured to transfer torque to a transmission that is operative in a plurality of transmission states, the method comprising:
 in response to a command to execute a multi-state shift event in the transmission in response to a command to accelerate, wherein the multi-state shift event includes sequentially executed transmission shifts to multiple transmission states, including an initial transmission state, an intermediate transmission state, and a final transmission state, wherein the intermediate transmission state is selected to avoid transmission operation in a prohibited state during the shift event:
 prior to completion of a first state transition of the multi-state shift event that includes a commanded torque reduction during a transition from the initial transmission state to the intermediate transmission state:
   determining an initial maximum output torque limit,
   determining an initial commanded output torque based upon the initial maximum output torque limit, and
   controlling the non-combustion torque machines to generate reactive torque in response to the initial commanded output torque; and
 after completion of the first state transition of the multi-state shift event, initiating operation in the intermediate transmission state to effect the commanded torque reduction, including:
   determining a torque ramp rate based upon the initial maximum output torque limit,
   adjusting the initial commanded output torque based upon the torque ramp rate, and
   controlling the powertrain system to generate torque in response to the initial commanded output torque and the adjusted initial commanded output torque during a remainder of the multi-state shift event from the intermediate transmission state to the final transmission state.

2. The method of claim 1, wherein the initial maximum output torque limit is determined in response to an accelerator pedal tip-in maneuver.

3. The method of claim 1, wherein controlling the powertrain system to generate torque comprises controlling the internal combustion engine to generate torque.

4. The method of claim 1, wherein controlling the powertrain system to generate torque in response to the initial commanded output torque comprises controlling the non-combustion torque machines to generate torque in response to the initial commanded output torque.

5. The method of claim 4, wherein controlling the non-combustion torque machines to generate torque in response to the initial commanded output torque comprises controlling the non-combustion torque machines to generate a reactive torque.

6. The method of claim 1, further comprising determining the initial commanded output torque based upon the initial maximum output torque limit and a plurality of system-based torque constraints.

7. A method for controlling a powertrain system including an internal combustion engine coupled to a step-gear transmission that is operative in a plurality of transmission states, wherein the transmission may be commanded to execute a multi-state shift event, the method comprising:
 in response to a command to execute a multi-state shift event in the transmission in response to a command to accelerate, wherein the multi-state shift event includes sequentially executed transmission shifts to a plurality of transmission states, including an initial transmission state, a first intermediate transmission state, a second intermediate transmission state, and a final transmission state, wherein the first and second intermediate transmission states are selected to avoid transmission operation in a prohibited state during the shift event:
 prior to completion of a first state transition of the multi-state shift event that includes a commanded torque reduction during a transition from the initial transmission state to the intermediate transmission state:
   determining an initial maximum output torque limit,
   determining an initial commanded output torque based upon the initial maximum output torque limit, and
   controlling the internal combustion engine to generate torque in response to the initial commanded output torque; and after completion of the first state transition of the multi-state shift event, initiating operation in the first and second intermediate transmission states to effect the commanded torque reduction, including:
  determining a torque ramp rate based upon the initial maximum output torque limit,
  adjusting the initial commanded output torque based upon the torque ramp rate, and
  controlling the internal combustion engine to generate torque in response to the initial commanded output torque and the adjusted initial commanded output torque during a remainder of the multi-state shift event from the first intermediate transmission state to the second intermediate transmission state to the final transmission state.

8. The method of claim 7, wherein the initial maximum output torque limit is determined in response to an accelerator pedal tip-in maneuver.

9. A multi-mode powertrain system, comprising:
  an internal combustion engine and non-combustion torque machines configured to transfer torque to a transmission, wherein the transmission is operative in a plurality of transmission states;
  a controller operatively connected to the internal combustion engine, the non-combustion torque machines and the transmission, the controller including an instruction set, the instruction set executable to:
  command a multi-state transmission shift, wherein the multi-state shift event includes sequentially executed transmission shifts to multiple transmission states, including an initial transmission state, an intermediate transmission state, and a final transmission state, wherein the intermediate transmission state is selected to avoid transmission operation in a prohibited state during the shift event:
  prior to completion of a first state transition of the multi-state shift event that includes a commanded torque reduction during a transition from the initial transmission state to the intermediate transmission state:
    determine an initial maximum output torque limit,
    determine an initial commanded output torque based upon the initial maximum output torque limit and a plurality of torque constraints, and
    control the non-combustion torque machines to generate reactive torque in response to the initial commanded output torque; and
  after completion of the first state transition of the multi-state shift event, initiating operation in the intermediate transmission state to effect the commanded torque reduction, including:
    determine a torque ramp rate based upon the initial maximum output torque limit,
    adjust the initial commanded output torque based upon the torque ramp rate, and
    control the powertrain system to generate torque in response to the initial commanded output torque and the adjusted initial commanded output torque during a remainder of the multi-state shift event from the intermediate transmission state to the final transmission state.

10. The multi-mode powertrain system of claim 9, wherein the initial maximum output torque limit is determined in response to an accelerator pedal tip-in maneuver.

11. The multi-mode powertrain system of claim 9, wherein the instruction set is executable to control the internal combustion engine to generate torque.

12. The multi-mode powertrain system of claim 9, wherein the instruction set is executable to control the non-combustion torque machines to generate torque in response to the initial commanded output torque.

13. The multi-mode powertrain system of claim 12, wherein the instruction set is executable to control the non-combustion torque machines to generate a reactive torque.

14. The multi-mode powertrain system of claim 9, wherein the initial commanded output torque is determined based upon the initial maximum output torque limit and a plurality of system-based torque constraints.

* * * * *